Feb. 3, 1959  B. DONOVAN ET AL  2,871,709
SELF-INTEGRATING FLICKER CONTROL ACTUATOR
Filed Sept. 16, 1957
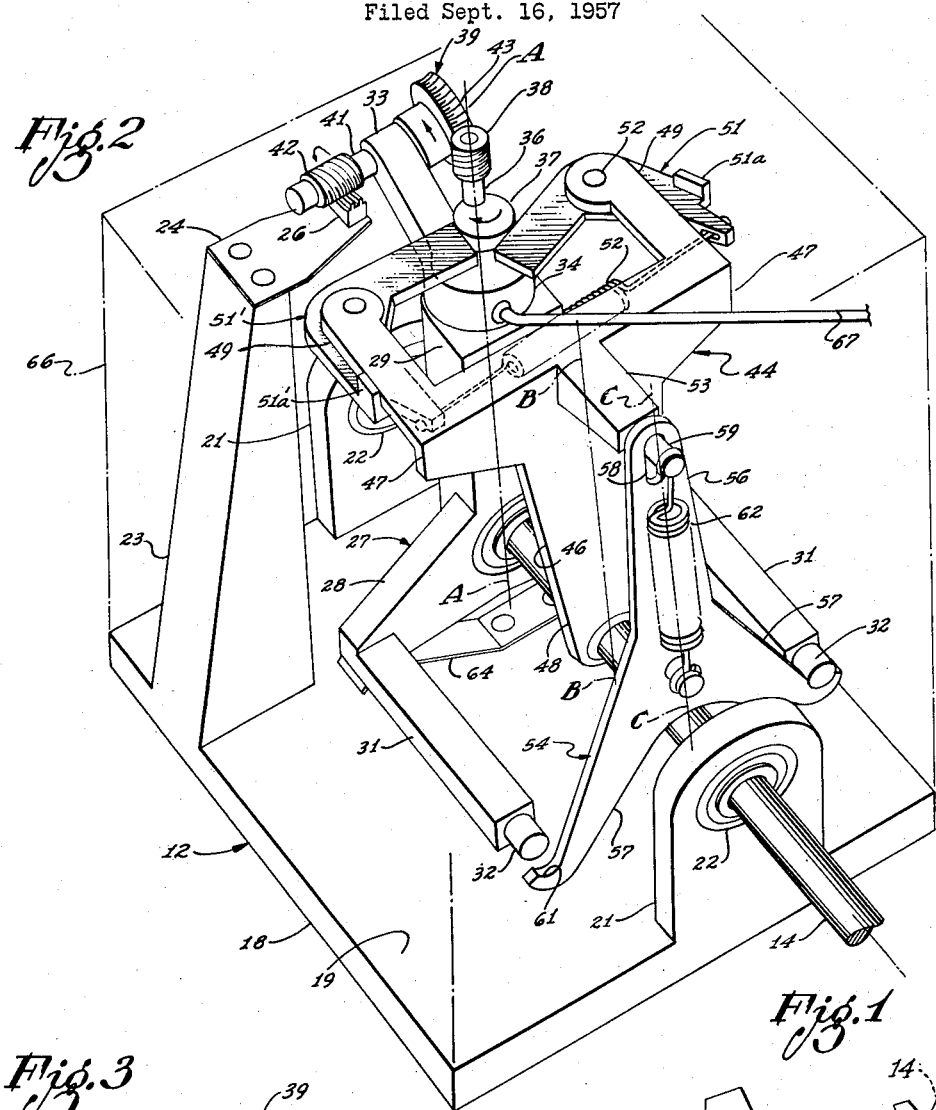
INVENTORS:
Bradford Donovan
Temple W. Neumann
Their Patent Attorney

United States Patent Office 2,871,709
Patented Feb. 3, 1959

2,871,709

SELF-INTEGRATING FLICKER CONTROL ACTUATOR

Bradford Donovan, Sepulveda, and Temple W. Neumann, Burbank, Calif., assignors to Northrop Aircraft, Inc., Hawthorne, Calif., a corporation of California Application September 16, 1957, Serial No. 684,008

7 Claims. (Cl. 74—54)

This invention relates to aircraft control components and more particularly to a self-integrating flicker type actuator especially useful in imparting movements to aircraft control surfaces and the like.

Conventional servo systems as currently utilized in aircraft for positioning the control surfaces thereof are necessarily complicated, space consuming, and therefore expensive. The preceding statement is especially true insofar as it pertains to the signal generating components of conventional servo systems. For example, in conventional practice it is necessary for the sensor components to provide output signals which are proportional to the rate of deviation from a desired flight course. Further it is necessary to incorporate means in a conventional system so that the servo actuators impart deflections to the aircraft's control surfaces which are also proportional to the signals generated by the aforementioned signal generating components.

In contrast to the type of servo system as described above the actuator as disclosed herein requires only a simple polarized signal to effect its operation. The instant actuator employs self-integrating and flicker type movements in its operation and the system's sensors need only sense polarity of deviation, i. e., plus or minus, up or down, etc. to effect the operation of the actuator. The instant actuator if utilized to provide the motivating force for deflecting and trimming the control surfaces of an aircraft will function as long as a simple polarized signal is received without interruption by the actuator.

An object of the present invention is to provide an actuator which imparts concurrently flicker-like and steady angular movements to the output member thereof.

Another object is to provide an actuator which is incorporated in a control system to position the control surfaces of an aircraft and in which the sensor components thereof need only sense polarity of deviation of the aircraft in which the system is mounted.

Another object is to provide an actuator which is simple and compact in design and construction, which is exceptionally free of malfunctioning tendencies, which is economical to manufacture, and which may be easily adapted to various installations.

Although the characteristic features of the present invention are particularly pointed out in the appended claims, the invention itself, also the manner in which it may be carried out, will be better understood by referring to the following description taken in connection with the accompanying drawing forming a part of this application and in which:

Figure 1 is a schematic view of an airplane in which an actuator of the type disclosed herein is utilized to position a control surface of the aircraft.

Figure 2 is a detailed perspective view of the actuator as utilized in the control system of Figure 1.

Figure 3 is a partial perspective view in detail of the actuator shown in Figure 2 with certain portions thereof in an alternate position.

Referring now to the drawings, Figure 1 shows an airplane 11 in which an actuator 12 of the type disclosed herein is utilized to position a control surface thereof. In Figure 1 the output member 14 of the actuator is connected in a conventional manner to position and trim the control surface 16. Command signals $C_e$ are transmitted from the component 17, which for illustrative purposes may constitute a short wave receiver or an electrical signal generating sensor such as an automatic pilot gyro, to the actuator 12 which in turn responds to move and trim the control surface 16.

The actuator 12 is shown in detail in Figure 2 and consists of a plate-like base member 18 having an upper plane surface 19. Mounted in a pair of lugs 21—21 formed integral with the base 18 and extending above the surface 19 is a shaft 14 which hereafter will be referred to as the output member of the actuator 12. The output member 14 is mounted in bearings 22—22 with its longitudinal axis extending parallel to the surface 19. Also extending above the surface 19 and formed integral with the member 18 is an arm 23 which carries a leaf spring 24 and a worm gear segment 26 at its upper end. The relationship and function of the spring 24 and gear segment 26 will be discussed in greater detail as the disclosure progresses.

Mounted for pivotal movement on the output member 14 is a support member 27 which is substantially T-shaped and is mounted in an inverted position as shown in Figure 2. In the mounted position of the member 27 the output member 14 passes through the juncture of the arms 28—28 (only one being shown) of the member 27 with the body portion 29 which extends above the output member. Extending from the outer ends of the arms 28—28, in a forward direction as viewed in Figure 2, is a pair of rigid elongated bearing members 31 each having a cylindrical bearing 32 formed at its outer or forward end. Extending in an aft direction from the body portion 29 is an arm 33 having a relative position substantially as shown. The function of the bearings 32—32 and arm 33 will become apparent as the disclosure progresses.

Mounted in a cavity, the latter being formed in the body portion of the member 27, is a bidirectional electrical motor 34 having an output shaft 36. Fixedly secured to the shaft 36, at a position adjacent the body of the motor 34, is an eccentric cam member 37 and fixedly secured to the outer end thereof is a worm 38.

Rotatably mounted in the outer end of the arm 33 is a gear assembly 39 which consists of a shaft 41, worm 42 and worm gear 43. The shaft 41 is restrained from longitudinal movement with respect to the arm 33 by any type of conventional means (not shown). With the assembly 39 in its assembled position on the arm 33, the teeth of the worm 42 mate with the teeth of the segment 26 and the teeth of the gear 43 mate with the teeth of the worm 38.

A torque arm assembly 44 is fixedly secured to the output member 14 at a position ahead of the member 27, accordingly it will be apparent that all angular movements of the assembly 44 will be imparted to the output member 14 in their entirety. The assembly 44 includes a T-shaped torque plate 46 having arm portions 47—47 and a leg portion 48 and which is attached to the member 14 by the outer end of the leg portion substantially as shown in Figure 2. Extending rearwardly from and formed integral with the outer ends of the arms 47—47 are a pair of extensions 49—49. Mounted at the aft end of each of the extensions 49—49 is right and left L-shaped pawl members 51 and 51'.

The pawl members 51—51' are respectively pivotally attached to the aft ends of the extensions 49 at the juncture of their leg portions as by pins 52 or the like. Ears 51a and 51'a are provided on the members 51 and 51', respectively, and which contact the sides of the extensions 49 to preclude angular movement of the members 51 and 51' in one direction beyond a predetermined position. A tension spring 52 extends between the members 51 and 51' normally maintaining the ears 51a and 51a' in contact with the extensions 49 and the members 51 and 51' in a position hereinafter referred to as their initial or rest position as shown in Figure 3. The members 51 and 51' are moved from their initial positions (Figure 3) to a displaced or operating position as shown in Figure 2 by the cam 37 in a manner presently explained.

Mounted on an arm 53, the latter extending forward of and formed integral with the plate 46, is a centering plate 54. The plate 54 is Y-shaped having a leg portion 56 and arm portions 57—57 and is mounted in the actuator 12 in an inverted position substantially as shown. A slot 58 is formed in the upper end of the leg portion 58 and embraces a pin 59 extending from the arm 53. A concave bearing surface 61 is provided at the outer ends of each of the arm portions 57. In the assembled position of the plate 54 on the assembly 44 the bearings 32—32 are received in the bearing surfaces 61. A tension spring 62 extending between the aforementioned pin 59 and a pin 63, the latter extending from the forward surface of the plate 54, acts to urge the plate 54 in an upward direction and normally maintains the surfaces 61 in contact with the bearings 32.

The support member 27, assembly 44 and plate 54 are symmetrically constructed about respective longitudinal axes A—A, B—B and C—C. The above elements, viz., the member 27, assembly 44 and plate 54, have centered positions in which each of the axes A—A, B—B and C—C are vertical and each intersects the longitudinal axis of the output member 14. Further, in the centered position of these members, the arm portions 28—28 are located equal distances above the surface 19 and are similarly positioned on opposite sides of the output member 14; also the arms 47—47 are equal distances above the surface 19 and are similarly positioned on opposite sides of the output member 14. Also at this time both of the bearings 32 are bottomed in the bearing surfaces 61. At this time the output member 14 is in a neutral position as no torque is being applied thereto in either direction.

It will also be seen that the member 27 and assembly 44 are proportioned so that the radial distance between the axis of the output member 14 and the cam 37 and the inner ends of the pawls 51 and 51' are equal. Thus the camming surface of the cam 37 will contact the inner ends of the pawls 51 and 51' at such time as the motor 34 is energized. A double leaf spring 64 is mounted on the surface 19 and contacts the arms 28—28 at each extreme of their angular travel about the axis of the output member 14. A case or cover 66, shown by phantom construction in Figure 2, may be utilized to protect the working components of the actuator 12.

The various components of the actuator 12 and their relative positions having been described, a better understanding of the actuator will be forthcoming from the following description of its operation.

If the control surface 16 is in a neutral position the components 27, 44 and 54 are also in their centered positions as described above and the output member 14 is in its neutral position. At this time the ears 51a and 51'a are in contact with the extensions 49 and the cam 37 is in a noncontacting position with respect to the aft edges of the inboard legs of the pawls 51 and 51'.

Assume now that a command signal $C_e$, originating with the component 17 and indicating divergence of the airplane 11 from a desired flight course, is transmitted to the motor 34 via the connector 67. The polarity of the signal $C_e$ will be such as to cause the motor 34 to rotate one way or the other, for example in a clockwise direction as viewed in Figure 2.

As the cam 37 rotates away from its noncontacting position (Figure 3) it first contacts the right hand pawl 51. This pawl is free to rotate about the pin 52 and does so without effecting other components of the actuator 12 by extending the spring 52 substantially as shown in Figure 2. Further rotation of the cam 37 causes its camming surface to contact the inboard end face of the left hand pawl 51'. Since the left hand pawl is restrained from rotating in a counter clockwise direction by the ear 51'a the cams rotary motion is transferred to the left hand pawl as translating motion. Accordingly the assembly 44 and the output member 14 is caused to rotate in a counter clockwise direction and the control surface 16 temporarily moved from and is substantially returned to its initial position in a manner as described below.

As the cam 37 continues to rotate it clears the inboard end of the pawl 51' at approximately the maximum angular deflection of the assembly 44. At this time the centering plate 54 has been rotated about the right hand bearing 32 by the action of pin 59. This rotational movement has caused the left hand bearing surface 61 to move away from the left hand bearing 32 substantially as shown in Figure 2. The spring 52 now exerts a restoring moment on the assembly 44 causing the latter to rotate about the right hand bearing and bearing surface 32 and 61, respectively. Thus, if movement due to the gear 42 rotating on the segment 26 is temporarily neglected, the assembly 44, the output member 14 and the control surface 16 are returned to their respective previous positions. This pulsing action will continue as long as the polarity of the signal $C_e$ is not reversed and is continuously received by the motor 34.

Concurrently with the above pulsing or flicker type action, and superimposed thereon, is a trimming or integrating action imparted to the control surface 16 by the actuator 12. As the shaft 36 of the electric motor rotates the worm 38 also rotates and in turn rotates the worm gear 43 and worm 42 as indicated by the arrows in Figure 2. The worm 42 in turn mates with the fixed gear segment 26. Thus it will be apparent that as the gear assembly 39 rotates angular movement will be imparted to the support member 27.

The above angular movement of the support member 27 is imparted to the torque plate 46 and in turn the output member 14 due to the fact that the member 27 and plate 46 are linked together by the centering plate 54. This latter action is the result of the left-hand bearing exerting a force on the left-hand bearing surface 61 causing the plate 54 to rotate with the assembly 27. Rotational movement of the plate 54 is imparted to the torque plate 46 through the pin 59. In this respect it will be understood that the spring 62 will exert sufficient force on the plate 54 to maintain the surfaces 61 in contact with each of the bearings 32 although the control surface 16 may be positioned in a non-neutral position.

The above trimming will continue as long as the worm 42 and worm segment 26 are in mesh and the signal $C_e$ is transmitted to the motor 34. However, in order to prevent jamming of the actuator components, when the maximum desired trim travel has been reached, the worm 42 is allowed to drive itself completely off the gear segment 26. The worm and gear segment are held in contact in their nonmeshing relation by the spring 64. Thus when the motor 34 is reversed the worm 42 smoothly rethreads itself on the worm gear segment 26 and continues to trim in the reverse direction.

In view of the above explanation it will be apparent that the actuator 12 will function in a similar but opposite sense at such time as the rotation of the motor 34 is reversed and further explanation in this respect is not believed necessary. The actuator as disclosed herein is particularly adapted to position the control surfaces of drone planes and the like although it may also be utilized in commercial planes and other applications.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed:

1. A pulsing and integrating actuator comprising: a base structure; an output shaft mounted for angular bidirectional movement on said structure; a prime mover having an output member mounted on said structure; a gear train operationally mounted between said structure and output member to impart angular movement to said output shaft at such time as said prime mover is actuated; and linkage means and cam means operationally mounted between said output member and output shaft and adapted to impart angular pulsing movements to said output shaft at such times as said prime mover is actuated.

2. Apparatus as set forth in claim 1: further characterized in that said prime mover is a bidirectional electric motor and the gear train, linkage means and cam means are mounted so that the initial movement imparted to said output shaft by said linkage means and cam means and by said gear train may be in either a clockwise or a counter-clockwise direction according to the direction of rotation of said motor.

3. In a pulsing and integrating actuator the combination comprising: a base structure; an output shaft mounted for angular bidirectional movement on said structure; a support assembly mounted for free pivotal movement on said shaft and having a pair of bearings located respectively on opposite sides of said shaft; an electric motor having an output member mounted on said support assembly; a torque arm fixedly secured to said shaft; a spring plate pivotally mounted on said torque arm and having a pair of bearing surfaces in which said bearings are normally bottomed; a gear train operationally mounted and extending between said structure and output member adapted to impart angular movement to said support assembly with respect to said structure when said motor is energized and said angular movement is in turn imparted to said torque arm and shaft through said spring plate.

4. Apparatus as set forth in claim 3: further characterized by including resilient means extending between said spring plate and torque arm and exerting a force tending to maintain said bearings and said bearing surfaces in contacting relation.

5. Apparatus as set forth in claim 4: further characterized by including linkage means pivotally mounted on said torque arm and which cooperates with a cam member mounted on said output member and which functions to impart bidirectional angular movement to said shaft according to the direction of rotation of said motor.

6. In an aircraft control apparatus including signal means adapted to receive or generate and transmit command signals to a pulsing and integrating actuator, the latter comprising: a base structure; an output shaft rotatably mounted on said structure; a prime mover mounted on said structure and having an output member; a gear train operationally mounted between said structure and output member adapted to transmit angular movement to said output shaft in response to signals transmitted to said prime mover by said signal means; and linkage means and cam means operationally mounted between said output member and output shaft and adapted to impart angular pusing movement to said output shaft in response to signals transmitted to said prime mover by said signal means.

7. Apparatus as set forth in claim 6: further characterized in that said signal means constitutes electrical apparatus, said prime mover constitutes an electric motor, and the gear train, linkage means and cam means are mounted so that the initial movement imparted to said output shaft by said linkage means and cam means and movement imparted to said output shaft by said gear train is unidirectional and is clockwise or counterclockwise according to the sense of said command signals.

UNITED STATES PATENTS

References Cited in the file of this patent 2,636,400      Recker _____ Apr. 28, 1953